May 14, 1935.　　　　S. WEISS　　　　2,001,045
EGG PACKAGING DEVICE
Filed Aug. 30, 1933　　　2 Sheets-Sheet 1
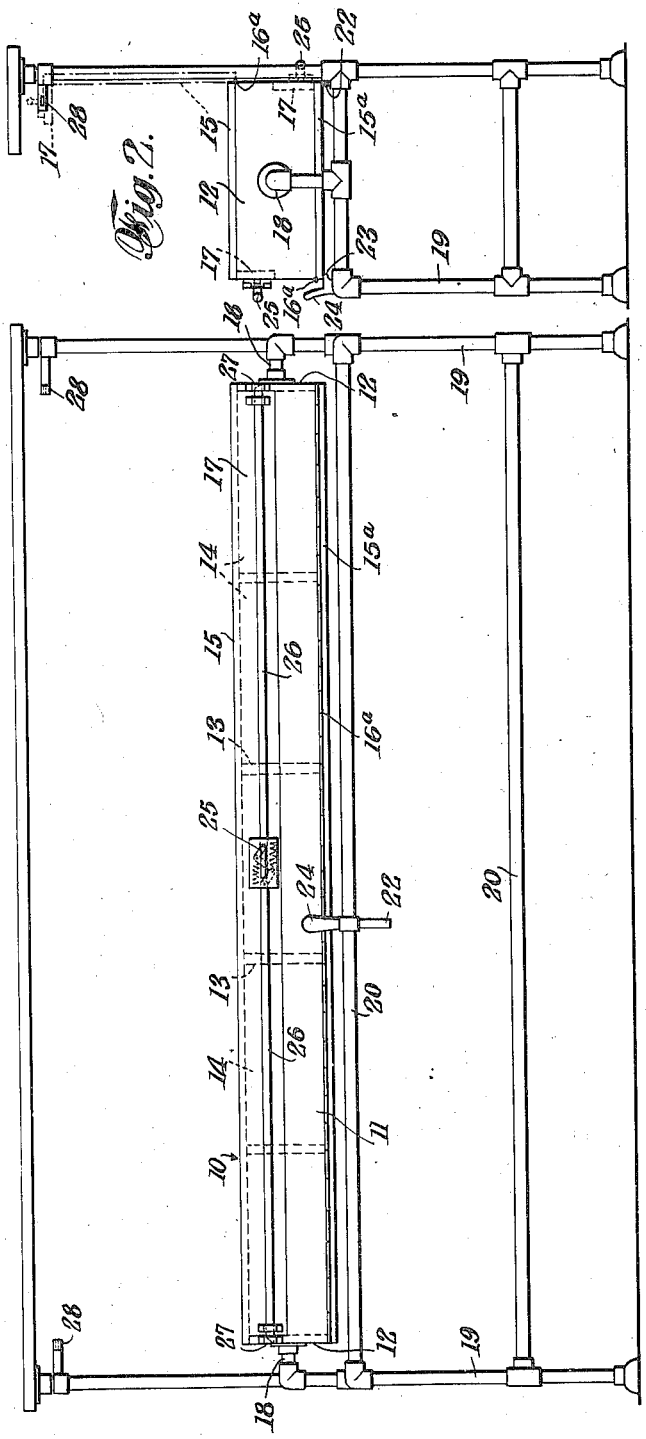
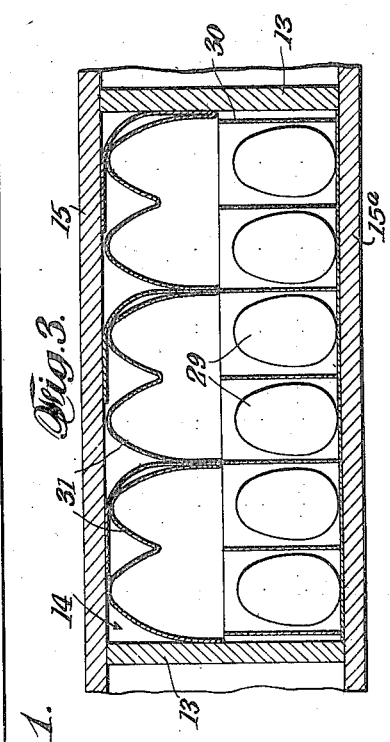
INVENTOR
SIDNEY WEISS
BY
ATTORNEY

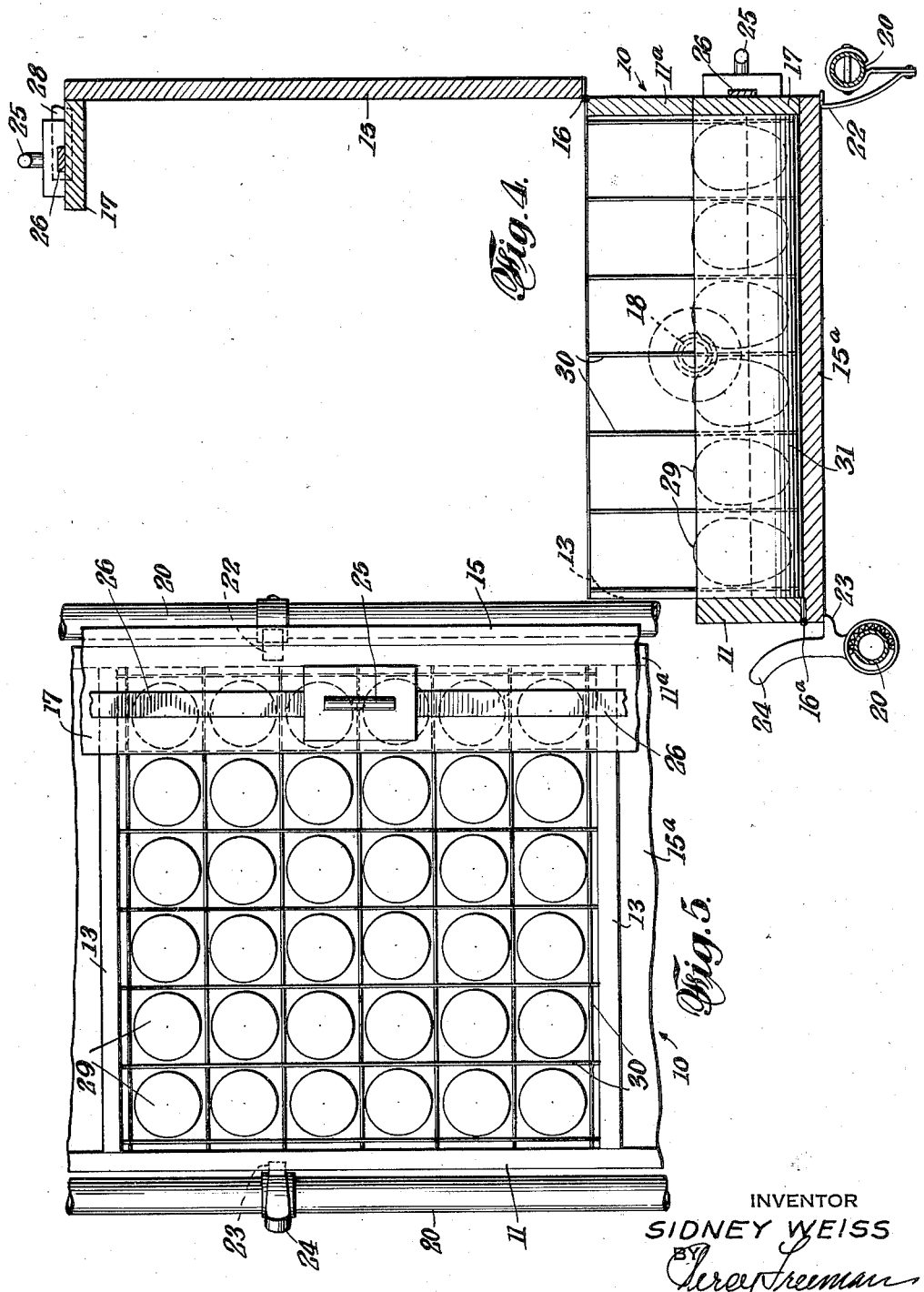

Patented May 14, 1935

2,001,045

UNITED STATES PATENT OFFICE 2,001,045

EGG PACKAGING DEVICE

Sidney Weiss, Brooklyn, N. Y.

Application August 30, 1933, Serial No. 687,411

9 Claims. (Cl. 226—14)

This invention relates to devices for packaging eggs.

The conventional egg crate contains thirty dozen eggs arranged in ten layers of three dozen each. The layers are separated by a paste board card and the eggs of each layer are maintained in position by a honey comb separator.

For years it has been the custom to sell eggs at retail in dozen lots and for convenience, egg cartons holding one dozen eggs have been widely used. To quickly conveniently and economically package the eggs from the crates into the individual dozen cartons has been a problem that has held the attention of dairy people for years.

The present invention contemplates a simple solution of this problem and has for its primary object the provision of a device into which layer after layer of eggs, as they are removed from the crate, may be inserted, together with unfilled cartons which may be placed thereover in an inverted position, the egg receiving container closed and then inverted so the eggs may slide gently from the honey comb separators into the cartons.

An important feature of the invention resides in the provision of an apparatus having a revoluble egg receiving tray provided with two oppositely hinged closure members which alternately form the bottom and cover for the tray so that in any given rest position the apparatus is ready to go through its cycle of operation.

Other features reside in the provision of means to lock the hinged closure members to the tray, and in means to maintain that closure member which is to act as the cover, in a substantially upright position.

A further feature lies in the provision of means to control the revoluble movement of the tray.

These advantageous features are accomplished by the novel and practical construction, combination and arrangement of parts hereinafter disclosed and illustrated in the accompanying drawings, constituting an essential part of the disclosure, and in which:

Fig. 1 is a front elevational view of an apparatus designed in accordance with the invention.

Fig. 2 is an end view thereof.

Fig. 3 is an enlarged partial sectional view through the egg tray before inverting.

Fig. 4 is a cross sectional view of the egg tray after inverting.

Fig. 5 is a plan view of the tray portion shown in Fig. 4.

In greater detail, the apparatus comprises an egg tray 10 having longitudinal panels 11 and 11a connected to end walls 12 and intermediate partitions 13. In this instance the tray comprises five egg compartments 14, though more or less may be used, since ½ a crate or fifteen dozen eggs may be packaged in one operation.

The tray 10 is provided with two closure members 15 and 15a, one hinged as at 16 to the panel 11a and the other hinged as at 16a to the diagonally opposite portion of the other panel 11.

The closure members 15, 15a are each preferably provided with an angularly disposed lip portion 17 which when closed, form continuations of their respective panels 11, 11a.

The tray is revolubly mounted at each end as at 18 and each pivot is supported from a frame such as is generally shown at 19. These frames may be connected for rigidity by longitudinal members 20. While the frames are shown as being fabricated from piping and pipe connections it is quite conceivable that they may be metal castings, or metal stamping or of any desirable construction and material.

Positioning detents are preferably provided to maintain the tray in either egg receiving position, the one at the rear of the tray, shown at 22 is automatic in its operation, while the other, 23, at the front is operable by means of the handle 24.

The closure members 15, 15a are each provided with means whereby they may be locked, in their closed position, to the tray. One form of such locking means comprises a handle 25 connected to locking bolts 26 carried by the closure members adapted to engage the keepers 27 on each end wall 12.

An extended portion of each frame 19 serves to support another keeper 28 for the bolts 25 when the closures are open.

In operation, the closure member 15 is opened by turning the handle 25 to withdraw the bolts carried thereon from its keepers 27 and raising it on its hinges 16 until the bolts are engaged in the keepers 28. This leaves the tray ready to receive the eggs and empty cartons, the other closure member 15a forming the bottom of the tray.

A layer of three dozen eggs 29 together with the honey comb separator 30 and cardboard divider is placed in each compartment 14. Empty cartons 31 of suitable capacity (one dozen) are disposed, inverted, over the eggs as shown in Fig. 3.

Now, the handle 25 is turned to withdraw the bolts 26 from the keepers 28 and the closure member 15 closed over the tray and the handle released to permit the bolts 26 to engage the keepers 27.

The tray is now revolved, by withdrawing the detent 23 and pushing down and then up on the forward upper corner of the tray until it cams past the automatic detent 22 at the rear of the apparatus, the detent 23 being permitted to return to its tray intercepting position.

The closure member 15a is now uppermost and the cartons are now right side up in the tray and supported in the member 15 with the eggs (which slid from the separators to the cartons during this half revolution) in them.

The closure member 15a is now opened as was the member 15, and upon removal of the empty separators the filled cartons may be removed. The tray in this condition is again ready to receive the layers of eggs and the empty carton for packaging.

It will be noted that with an apparatus having five compartments, ½ a case of eggs may be packaged with a half turn of the tray and a complete cycle of the tray serves to package an entire case.

From the foregoing it will be seen that a simple device for the purpose has been disclosed in the preferred form of its embodiment, but it is not desired to restrict the details to the exact construction shown, it being obvious that changes, not involving the exercise of invention, may be made without departing from the scope of the appended claims.

Having thus described my invention, what I claim as new and desire to secure by Letters Patent, is:

1. An egg packaging device comprising a revoluble tray adapted to receive layers of eggs and empty cartons and having oppositely hinged opposed closures, means to maintain the tray with either closure uppermost, part of said last mentioned means being retractable to permit the tray to be revolved one-half revolution whereby the eggs within the tray may slide into the empty cartons.

2. In an egg packaging device, a revolubly mounted tray adapted to receive layers of eggs and empty cartons invertedly disposed over the eggs, opposed hinged closures on the tray, means to lock the closure members to the tray, each of said closures alternately forming the bottom and cover of the tray when the tray is revolved to slide the eggs into the empty cartons, means to maintain the tray in horizontal position, and part of said latter means being retractable to permit the tray to be revolved one-half revolution to deposit the eggs from the tray into the cartons.

3. In an egg packaging device, a revolubly mounted tray adapted to receive layers of eggs and empty cartons invertedly disposed over the eggs, opposed hinged closures on the tray, bolt means carried by each closure and keepers on the tray engageable by the bolts, each of said closures alternately forming the bottom and cover of the tray when the tray is revolved to slide the eggs into the empty cartons, means to maintain the tray in horizontal position, and part of said latter means being retractable to permit the tray to be revolved one-half revolution to deposit the eggs from the tray into the cartons.

4. In an egg packaging device, a revolubly mounted tray adapted to receive layers of eggs and empty cartons invertedly disposed over the eggs, opposed hinged closures on the tray, bolt means carried by each closure and keepers on the tray engageable by the bolts, handle means to manipulate the bolt means, each of said closures alternately forming the bottom and cover of the tray when the tray is revolved to slide the eggs into the empty cartons, means to maintain the tray in horizontal position, and part of said latter means being retractable to permit the tray to be revolved one-half revolution to deposit the eggs from the tray into the cartons.

5. In an egg packaging device, a revolubly mounted tray adapted to receive layers of eggs and empty cartons invertedly disposed over the eggs, opposed hinged closures on the tray, bolt means carried by each closure and keepers on the tray engageable by the bolts, other keepers adapted to be engaged by the bolts of an opened closure member, each of said closures alternately forming the bottom and cover of the tray when the tray is revolved to slide the eggs into the empty cartons.

6. In an egg packaging device, a compartmented egg receiving revoluble tray having hinged closure members alternately forming the bottom and cover thereof, means to maintain the tray with either closure uppermost, and part of said means being retractable to permit the tray to be revolved one-half a revolution.

7. In an egg packaging device an egg and carton receiving revoluble tray comprising two end walls, panels approximately half the height of the end walls, secured to the end walls, one of said panels extending upwardly from the bottom of the end walls and the other panel extending downwardly from the top of the end walls, closure members hinged to the tray at diagonally opposite corners to serve alternately as top and bottom of the tray, and each closure having along its edge opposite its hinge an angularly disposed lip to form a continuation of the respective panels when the closure is closed.

8. In an egg packaging device an egg and carton receiving revoluble tray comprising two end walls, panels approximately half the height of the end walls, secured to the end walls, one of said panels extending upwardly from the bottom of the end walls and the other panel extending downwardly from the top of the end walls, closure members hinged to the tray at diagonally opposite corners to serve alternately as top and bottom of the tray, and each closure having along its edge opposite its hinge an angularly disposed lip to form a continuation of the respective panels when the closure is closed, and closure fasteners for each closure.

9. In an egg packaging device a tray adapted to receive layers of eggs and empty cartons invertedly disposed over the eggs, a frame to revolubly support the tray, opposed hinged closures on the tray, closure fastener means carried by each closure, keepers on the tray engageable by the fasteners, other keepers on the frame engageable by the fasteners and adapted to be engaged by the fasteners of an opened closure member, each of said closures alternately forming the bottom and cover of the tray when the tray is revolved to deposit eggs into the empty cartons, spring actuated detents on the frame to maintain the tray in horizontal position, and one of said detents being manually retractable to permit the tray to be revolved one-half a revolution.

SIDNEY WEISS.